United States Patent
Nakagawa et al.

(10) Patent No.: US 10,144,077 B2
(45) Date of Patent: Dec. 4, 2018

(54) WIRE ELECTRICAL DISCHARGE APPARATUS AND INITIAL HOLE MACHINING METHOD

(71) Applicant: Mitsubishi Electric Corporation, Tokyo (JP)

(72) Inventors: Takayuki Nakagawa, Tokyo (JP); Tomoaki Takada, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/567,712

(22) PCT Filed: Apr. 23, 2015

(86) PCT No.: PCT/JP2015/062397
§ 371 (c)(1),
(2) Date: Oct. 19, 2017

(87) PCT Pub. No.: WO2016/170645
PCT Pub. Date: Oct. 27, 2016

(65) Prior Publication Data
US 2018/0161899 A1  Jun. 14, 2018

(51) Int. Cl.
*B23H 7/10* (2006.01)

(52) U.S. Cl.
CPC .............. *B23H 7/10* (2013.01); *B23H 7/102* (2013.01)

(58) Field of Classification Search
CPC .................................. B23H 7/10; B23H 7/102
See application file for complete search history.

(56) References Cited

U.S. PATENT DOCUMENTS

| 4,652,717 A * | 3/1987 | Briffod | B23H 7/04 219/69.12 |
| 5,006,692 A * | 4/1991 | Magara | B23H 7/102 219/69.12 |
| 5,045,662 A * | 9/1991 | Yamada | B23H 7/10 219/69.12 |
| 5,057,663 A * | 10/1991 | Kinoshita | B23H 7/102 219/69.12 |

(Continued)

FOREIGN PATENT DOCUMENTS

| JP | 58-114819 A | * | 7/1983 |
| JP | 58-202725 A | * | 11/1983 |

(Continued)

OTHER PUBLICATIONS

Machine translation of Japan Patent document No. 2000-126,935, dated Aug. 2018.*

(Continued)

*Primary Examiner* — Geoffrey S Evans
(74) *Attorney, Agent, or Firm* — Sughrue Mion, PLLC; Richard C. Turner

(57) ABSTRACT

A wire electrical discharge apparatus includes a wire bobbin on which a wire electrode is wound, a straightening treatment unit to perform straightening treatment on the wire electrode fed from the wire bobbin, a machining power supply to apply a voltage between the wire electrode and a workpiece via a feed terminal set above the workpiece and contacting the wire electrode, and a control unit to control the straightening treatment unit and the machining power supply so as to apply a voltage between the workpiece and the wire electrode that has been subjected to the straightening treatment, to perform electrical discharge machining to form an initial hole in the workpiece.

10 Claims, 9 Drawing Sheets

(56) References Cited

U.S. PATENT DOCUMENTS

| | | | | |
|---|---|---|---|---|
| 5,073,691 A | * | 12/1991 | Magara | B23H 7/10 219/69.12 |
| 5,077,457 A | * | 12/1991 | Onaka | B23H 7/10 219/69.12 |
| 5,338,912 A | | 8/1994 | Iwasaki et al. | |
| 5,603,851 A | * | 2/1997 | Noda | B23H 7/102 219/69.12 |
| 6,403,911 B1 | | 6/2002 | Shih et al. | |
| 6,698,639 B1 | * | 3/2004 | Otomo | B23H 7/101 219/69.12 |
| 2008/0142487 A1 | * | 6/2008 | Sakaguchi | B23H 7/102 219/69.12 |

FOREIGN PATENT DOCUMENTS

| | | | | |
|---|---|---|---|---|
| JP | 62-094225 A | | 4/1987 | |
| JP | 62-124824 A | | 6/1987 | |
| JP | 02-048117 A | | 2/1990 | |
| JP | 02-106227 A | | 4/1990 | |
| JP | 02-145215 A | | 6/1990 | |
| JP | 02-279230 A | | 11/1990 | |
| JP | 03-154720 A | * | 7/1991 | |
| JP | 03-170227 A | | 7/1991 | |
| JP | 04-141322 A | | 5/1992 | |
| JP | 2000-126935 A | * | 5/2000 | |
| JP | 2008-000834 A | | 1/2008 | |

OTHER PUBLICATIONS

International Search Report for PCT/JP2015/062397 dated Jul. 21, 2015 [PCT/ISA/210].

Written Opinion for PCT/JP2015/062397 dated Jul. 21, 2015 [PCT/ISA/237].

Decision to Grant a Patent of Corresponding JP Application No. 2015-557681 dated Mar. 11, 2016.

* cited by examiner

WIRE ELECTRICAL DISCHARGE APPARATUS AND INITIAL HOLE MACHINING METHOD

CROSS REFERENCE TO RELATED APPLICATIONS

This application is a National Stage of International Application No. PCT/JP2015/062397 filed Apr. 23, 2015, the contents of all of which are incorporated herein by reference in their entirety.

FIELD

The present invention relates to a wire electrical discharge apparatus that machines an initial hole through which to thread a wire electrode and an initial hole machining method.

BACKGROUND

A function of automatically threading a wire electrode has been implemented. In particular, a curve of a wire electrode due to the electrode having been wound on a wire bobbin is straitened, such that the wire electrode is automatically threaded even through a thick workpiece of 100 mm or more if an initial hole has already been formed in the workpiece, thereby enabling a start of electrical discharge machining. In this case, however, since it is necessary to perform machining of the initial hole in the workpiece in advance, the workpiece should be placed on a wire electrical discharge machine after the initial hole is machined in the workpiece by a dedicated machine, or a dedicated unit for the initial hole machining should be mounted on the wire electrical discharge machine. Both of these two approaches require a re-setup, and thus fully automatic initial-hole machining has not been implemented.

CITATION LIST

Patent Literature

Patent Literature 1: JP H02-145215 A

SUMMARY

Technical Problem

For example, Patent Literature 1 discloses a technique regarding a wire-electrode automatic threading function, and describes the straightening treatment on the wire electrode. However, this technique threads the wire electrode through the initial hole already formed. Patent Literature 1 does not describe the machining of the initial hole.

The present invention has been made in view of the above, and has an object of providing a wire electrical discharge apparatus capable of machining an initial hole using a wire electrode fed in a curved state from a wire bobbin.

Solution to Problem

In order to solve the above-described problem and attain the object, the present invention comprises: a wire bobbin on which a wire electrode is wound; a straightening treatment unit to perform straightening treatment on the wire electrode fed from the wire bobbin; a machining power supply to apply a voltage between the wire electrode and a workpiece via a feed terminal set above the workpiece and contacting the wire electrode. The invention also comprises a control unit to control the straightening treatment unit and the machining power supply so as to apply a voltage between the workpiece and the wire electrode that has been subjected to the straightening treatment, to perform electrical discharge machining to form an initial hole in the workpiece.

Advantageous Effects of Invention

The wire electrical discharge apparatus according to the present invention achieves an effect that the initial hole can be machined using the wire electrode fed in the curved state from the wire bobbin.

DESCRIPTION OF EMBODIMENTS

Hereinafter, a wire electrical discharge machine and an initial hole machining method according to embodiments of the present invention will be described in detail with reference to the drawings. The embodiments are not intended to limit the invention.

First Embodiment

Figure 1:
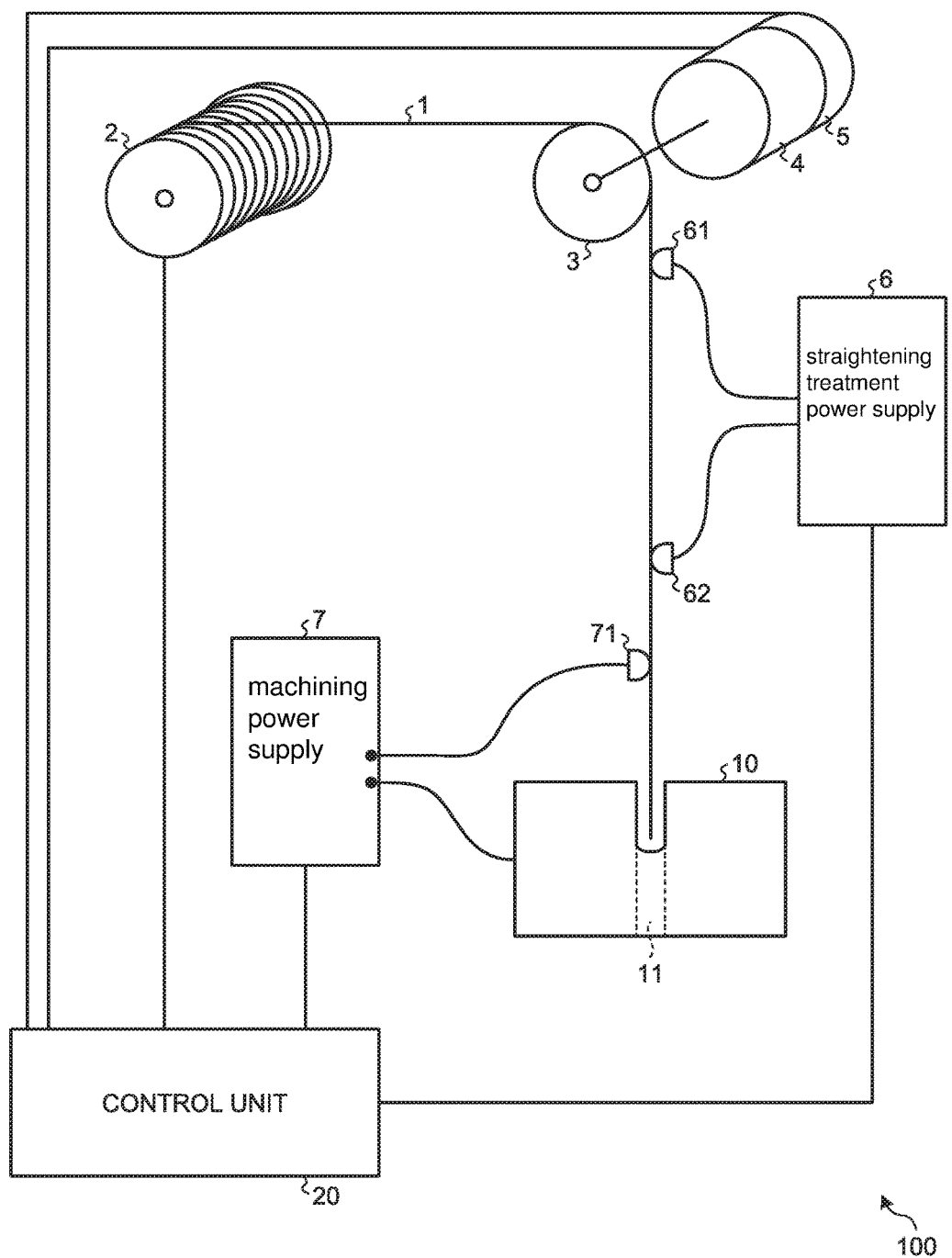
FIG. 1 is a diagram illustrating the configuration of a wire electrical discharge apparatus according to a first embodiment of the present invention.

FIG. 1 is a diagram illustrating the configuration of a wire electrical discharge apparatus 100 according to a first embodiment of the present invention. The wire electrical discharge apparatus 100 includes a wire electrode 1, a wire bobbin 2, a wire feed roller 3, a wire feed motor 4, an encoder 5, a straightening treatment power supply 6, and a machining power supply 7. The wire electrode 1 is to be an electrical discharge electrode. The wire bobbin 2 has the wire electrode 1 wound thereon for feeding the wire electrode 1. The wire feed roller 3 is disposed on a path along which the wire electrode 1 runs. The wire feed motor 4 drives the wire feed roller 3. The encoder 5 detects the rotation angle of the wire feed motor 4. The straightening treatment power supply 6 is a straightening treatment unit that performs straightening treatment on the wire electrode 1 with an upper energization terminal 61 and a lower energization terminal 62 held in contact with the wire electrode 1. The machining power supply 7 that applies a voltage for electrical discharge machining between the wire electrode 1 and a workpiece 10 to be machined by the wire electrode 1 via a feed terminal 71 contacting the wire electrode 1. The wire feed roller 3 is operated by the wire feed motor 4 to undergo a rotational movement, thereby feeding the wire electrode 1 in the direction toward the workpiece 10. The machining power supply 7 feeds electrical discharge machining pulses to the wire electrode 1 and the workpiece 10 via the feed terminal 71. The feed terminal 71 is set above the workpiece 10. Here, the straightening treatment power supply 6 performs the straightening treatment on the wire electrode 1 by carrying a current to the wire electrode 1 via the upper energization terminal 61 and the lower energization terminal 62, and thus heating, that is, annealing the wire electrode 1. However, the straightening treatment method by the straightening treatment unit is not limited to the energization heating, but may be a method of applying a heat by a heater.

The wire electrical discharge apparatus 100 also includes a control unit 20 that controls the wire bobbin 2, the wire feed motor 4, the straightening treatment power supply 6, and the machining power supply 7. The control unit 20 is a numerical control unit, and controls the wire electrical discharge machining by controlling the relative position (not shown) between the wire electrode 1 and the workpiece 10.

In the wire electrical discharge apparatus 100 according to the first embodiment, the control unit 20 controls the straightening treatment power supply 6 such that the wire electrode 1 fed from the wire bobbin 2 is subjected to the straightening treatment. Then, the control unit 20 controls the machining power supply 7 to apply a voltage between the workpiece 10 and the wire electrode 1 that has been subjected to the straightening treatment, such that the electrical discharge machining is performed to machine and form an initial hole 11 in the workpiece 10. Thus, the straight initial hole 11 can be machined in the workpiece 10.

Figure 2:
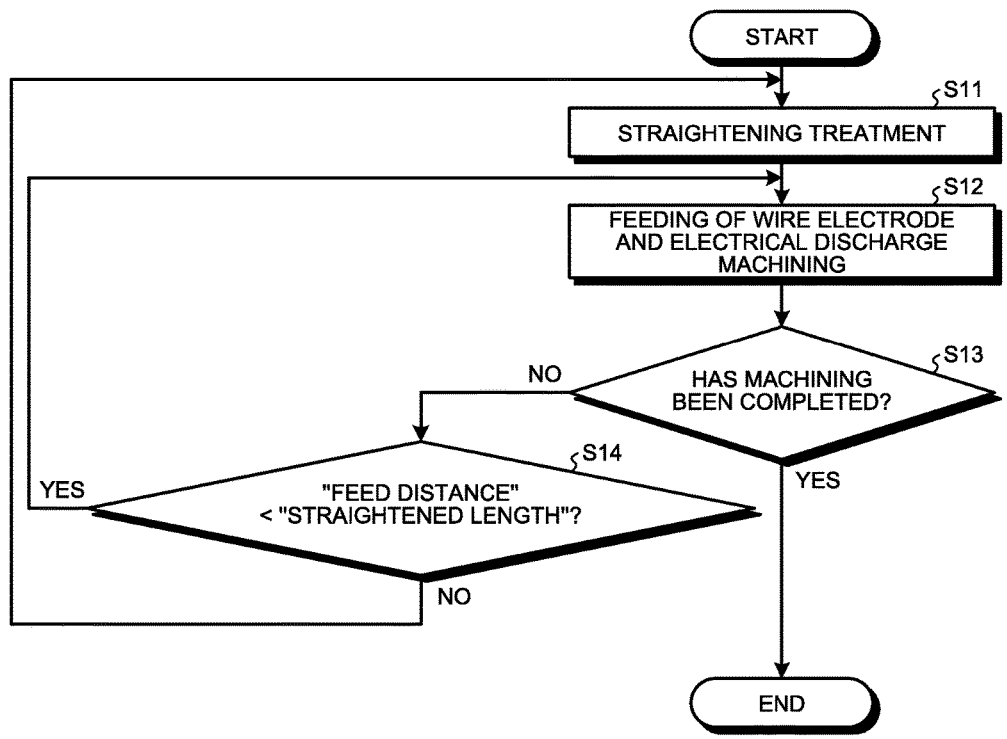
FIG. 2 is a flowchart illustrating the flow of straightening treatment performed a plurality of times according to the first embodiment.

Further, in the wire electrical discharge apparatus 100, the straightening treatment can be performed a plurality of times. FIG. 2 is a flowchart illustrating the flow of the straightening treatment performed the plurality of times according to the first embodiment. First, the straightening treatment power supply 6 performs the straightening treatment on the wire electrode 1 (step S11). The length of the wire electrode 1 subjected to the straightening treatment once in step S11 is referred to as a "straightened length." The "straightened length" is the length of the wire electrode 1 stretched between the upper energization terminal 61 and the lower energization terminal 62, and is a value such as 300 mm.

After step S11, the wire electrode 1 is fed from the wire bobbin 2, and the electrical discharge machining is performed (step S12) to machine the initial hole 11 in the workpiece 10. After step S12, it is determined whether the wire electrode 1 has passed through the workpiece 10 and the machining of the initial hole 11 has been completed or not (step S13). When the machining of the initial hole 11 has been completed (step S13: Yes), the process ends.

When the machining of the initial hole 11 has not been completed (step S13: No), the control unit 20 determines whether the "feed distance" of the wire electrode 1 is smaller than the "straightened length" or not (step S14). The "feed distance" is a distance by which the wire electrode 1 has been fed from the wire bobbin 2 after the straightening treatment in step S11. The control unit 20 holds the "straightened length." To perform the determination in step S14, the control unit 20 determines the "feed distance" on the basis of a value into which the rotation angle of the wire feed motor 4 detected by the encoder 5 is converted. When the control unit 20 determines that the "feed distance" of the wire electrode 1 is smaller than the "straightened length" (step S14: Yes), the process returns to step S12 to continue the machining. When the control unit 20 determines that the "feed distance" of the wire electrode 1 is larger than or equal to the "straightened length" (step S14: No), the control unit 20 resets the "feed distance" to zero, and causes the straightening treatment power supply 6 to perform the straightening treatment again (step S11). Thus, the straightening treatment can be seamlessly performed on the wire electrode 1 used for machining. That is, in the wire electrical discharge apparatus 100 according to the first embodiment, when the wire electrode 1 is fed by the distance of the "straightened length," the straightening treatment is performed again on the wire electrode 1, so that the straight initial hole 11 can be machined even when the workpiece 10 is thick.

Second Embodiment

Figure 3:
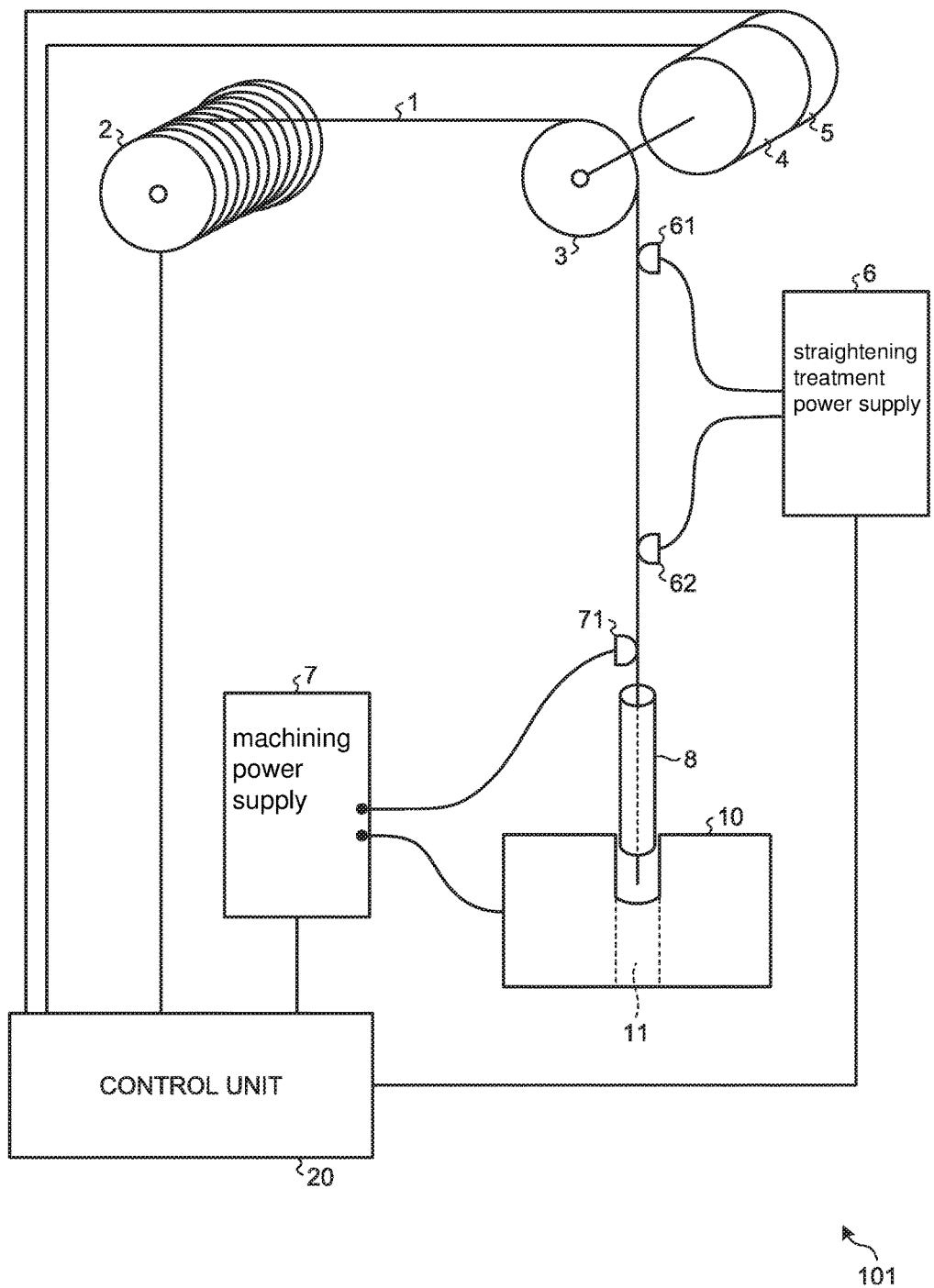
FIG. 3 is a diagram illustrating the configuration of a wire electrical discharge apparatus according to a second embodiment of the present invention.

FIG. 3 is a diagram illustrating the configuration of a wire electrical discharge apparatus 101 according to a second embodiment of the present invention. The wire electrical discharge machine 101 of FIG. 3 is the wire electrical discharge apparatus 100 of FIG. 1 with a guide pipe 8 added. Thus, the description of the same components as those of the wire electrical discharge apparatus 100 of FIG. 1 is omitted. In FIG. 3, the guide pipe 8 is provided below the feed terminal 71 and above the workpiece 10. The wire electrode 1 extending from the feed terminal 71 toward the workpiece 10 can pass through the inside of the guide pipe 8. Although not shown, the guide pipe 8 is restricted such that the guide pipe 8 can move only vertically. That is, the guide pipe 8 is configured to be freely movable vertically. The distal end of the wire electrode 1 passing through the inside of the guide pipe 8 faces the workpiece 10.

In order to avoid occurrence of electrical discharges between the guide pipe 8 and the workpiece 10, the guide pipe 8 needs to have an insulation property relative to the wire electrode 1 passing through the inside of the guide pipe 8. Specifically, the entire guide pipe 8 may be made of an electrically nonconductive ceramic material, or may be made of another electrically nonconductive material. The guide pipe 8 itself may be of a material having electrical conductivity, provided that, for example, the inside of the guide pipe 8 is coated with an insulation material to provide the insulation property between the wire electrode 1 and a contact portion of the guide pipe 8 with the wire electrode 1.

Figure 4:
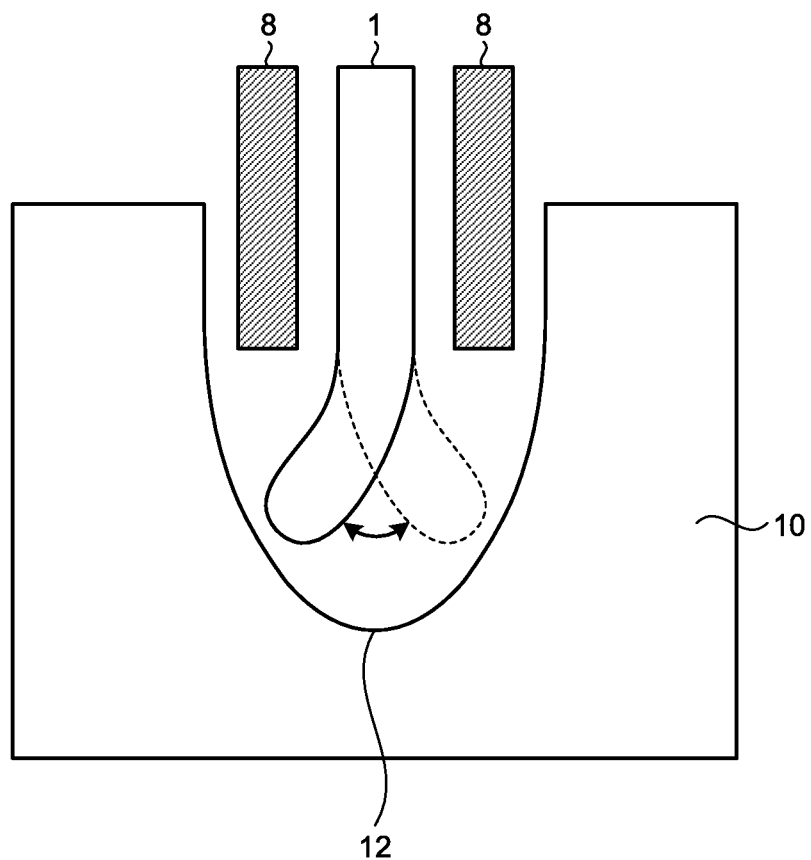
FIG. 4 is an enlarged view illustrating how the distal end of a wire electrode of the wire electrical discharge apparatus according to the second embodiment faces and machines a workpiece.

FIG. 4 is an enlarged view illustrating how the distal end of the wire electrode 1 of the wire electrical discharge apparatus 101 according to the second embodiment faces and machines the workpiece 10. As illustrated in FIG. 4, the wire electrode 1, which is fed as the wire electrode 1 is guided by the guide pipe 8, faces the workpiece 10 with its distal end protruding from the guide pipe 8. In this state, the electrical discharge machining is performed. The distal end of the wire electrode 1 protruding from the guide pipe 8 is vibrating due to, for example, the flow of dielectric fluid fed during the machining and an explosive power generated by the electrical discharge machining.

A machined hole 12 of a diameter larger than the diameter of the wire electrode 1 is machined in the workpiece 10 by the vibration of the distal end of the wire electrode 1. The guide pipe 8 then descends in the machined hole 12. There is no drive mechanism for feeding the guide pipe 8 downward. The guide pipe 8 moves downward by gravitation due to its own weight. The guide pipe 8, which has descended in the machined hole 12, descends further as the machined hole 12 is drilled further by the electrical discharge machining. When the distal end of the wire electrode 1 vibrates and the diameter of the machined hole 12 becomes larger than the outer diameter of the guide pipe 8, the guide pipe 8 descends, thus enabling the machining of the machined hole 12 of a uniform diameter about 0.01 mm to 0.1 mm larger than the diameter of the guide pipe 8. When the wire electrode 1 has passed through the workpiece 10, the machining of a straight initial hole 11 is achieved.

Thus, in the wire electrical discharge apparatus 101 according to the second embodiment, thus, to perform the machining, the wire electrode 1 is fed to the workpiece 10 as the guide pipe 8 guides the wire electrode 1. As a result, the straight initial hole 11 can be machined even in a workpiece of a large thickness. Further, since the insulation property is provided between the guide pipe 8 and a workpiece to prevent occurrence of an electrical discharge therebetween, it is unlikely that the guide pipe 8 wears due to such an electrical discharge. Consequently, the frequency of replacement of the guide pipe 8 can be reduced.

Third Embodiment

Figure 5:
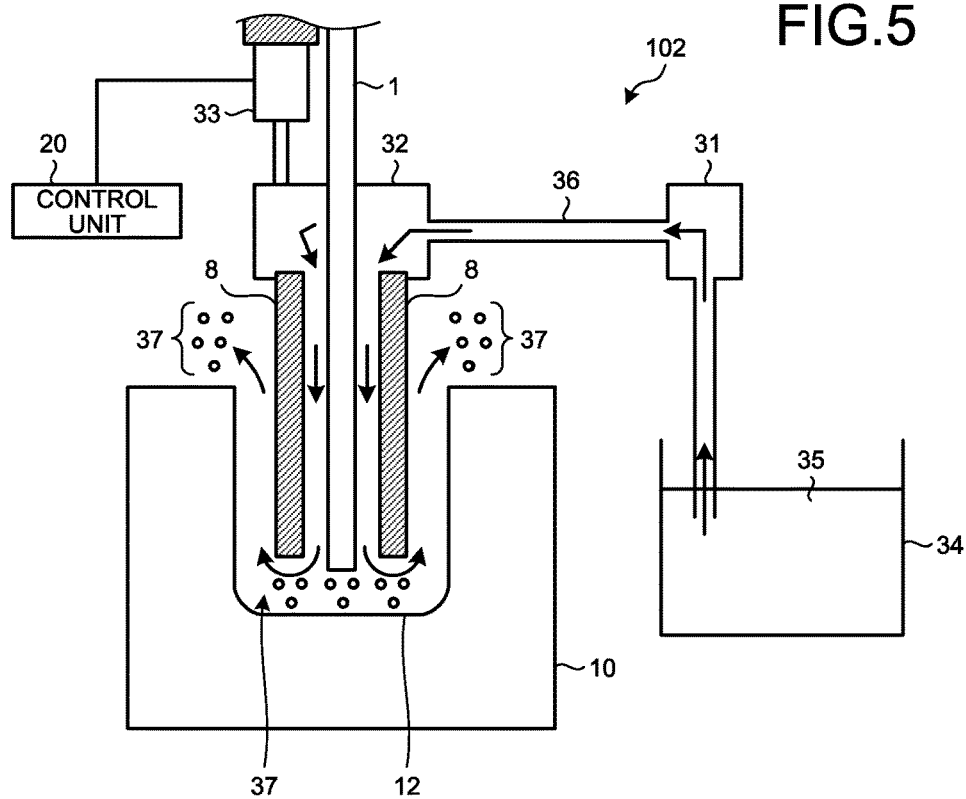
FIG. 5 is a diagram illustrating the configuration of a wire electrical discharge apparatus according to a third embodiment of the present invention.

FIG. 5 is a diagram illustrating the configuration of a wire electrical discharge apparatus 102 according to a third embodiment of the present invention. The wire electrical discharge apparatus 102 of FIG. 5 differs from the wire electrical discharge machine 101 of FIG. 3 in that the wire electrical discharge apparatus 102 further includes: a machining fluid feed pump 31 that feeds a machining fluid 35; a coupling 32 through which the fed machining fluid 35 flows into the inside of the guide pipe 8; and a guide-pipe drive unit 33 that pushes the guide pipe 8 and the coupling 32 downward. Thus in FIG. 5, part of the wire electrical discharge apparatus 102, mainly those added elements are illustrated. The description of the same components as those of the wire electrical discharge machine 101 in FIG. 3 is omitted. In the wire electrical discharge apparatus 102, the machining fluid 35 flows between the wire electrode 1 and the workpiece 10 during the electrical discharge machining. The guide-pipe drive unit 33 is controlled by the control unit 20, and operates under power such as a motor.

The machining fluid feed pump 31 and the coupling 32 are connected by a hose 36 through which the machining fluid 35 flows. The machining fluid feed pump 31 pumps out the machining fluid 35 in a machining fluid tank 34, and feeds the machining fluid 35 to the inside of the guide pipe 8 via the coupling 32 set on the top of the guide pipe 8. The coupling 32 is configured to allow the machining fluid 35 to flow through the inside of the guide pipe 8 with the wire electrode 1 passing through the inside of the guide pipe 8. The machining fluid 35 flows between the inside of the guide pipe 8 and the wire electrode 1, and then between the distal end of the wire electrode 1 and the workpiece 10. In a situation where the machined hole 12 is formed in the workpiece 10, the distal end of the guide pipe 8 is inserted in the machined hole 12. Thus, the machining fluid 35 flows upward between a side surface of the guide pipe 8 and a side surface of the machined hole 12, thereby discharging cut debris 37 generated during the electrical discharge machining to the outside of the machined hole 12. The wire electrical discharge apparatus 102 according to the third embodiment can efficiently discharge the cut debris 37 from the machined hole 12 to the outside by the flow of the machining fluid 35, and thus can improve a speed at which the initial hole 11 is machined.

Here, in order to prevent the rising of the guide pipe 8 when the machining fluid 35 flows, the guide-pipe drive unit 33 needs to push the guide pipe 8 downward. However, when the guide pipe 8 is pushed by a very large force, the distal end of the guide pipe 8 comes into contact with the bottom of the machined hole 12, resulting in failure to provide a flow path of the machining fluid 35. Thus, the guide-pipe drive unit 33 pushes the guide pipe 8 and the coupling 32 downward by a thrust lower than or equal to a fixed thrust.

Specifically, it is thought that the product of (the pressure of the machining fluid 35 fed to the inside of the guide pipe 8) and (the area of the outer diameter of the guide pipe 8) is a pressure of the machining liquid 35 acting as a reaction force applied to the guide pipe 8 upwardly. Thus, when the guide pipe 8 is pushed by a thrust greater than or equal to the product of (the pressure of the machining fluid 35 fed to the inside of the guide pipe 8) and (the area of the outer diameter of the guide pipe 8), there is a possibility that the distal end of the guide pipe 8 contacts the bottom of the machined hole 12 and fails to provide the flow path of the machining fluid 35. Thus, during the electrical discharge machining in which the machining fluid 35 flows, the guide-pipe drive unit 33 is controlled by the control unit 20 so as to push the guide pipe 8 downward by a thrust smaller than the product of (the pressure of the machining fluid 35 fed to the inside of the guide pipe 8) and (the area of the outer diameter of the guide pipe 8).

If the condition that a thrust by which the guide pipe 8 is pushed downward is smaller than the product of (the pressure of the machining fluid 35 fed to the inside of the guide pipe 8) and (the area of the outer diameter of the guide pipe 8) is satisfied, the guide pipe 8 may be configured to be pushed downward by gravitation due to a weight added to the guide pipe 8 or the weight of the guide pipe 8 itself without such a mechanism as the guide-pipe drive unit 33 of FIG. 5.

Since the wire electrical discharge apparatus 102 maintains an appropriate value of thrust to push the guide pipe 8 downward, the wire electrical discharge apparatus 102 can provide a gap that is a flow path of the machining fluid 35 between the lower distal end of the guide pipe 8 and the workpiece 10 under the pressure of the machining fluid 35, so that the cut debris 37 can be efficiently discharged from the machined hole 12 to the outside. Consequently, the speed at which the initial hole 11 is machined can be improved.

Fourth Embodiment

Figure 6:
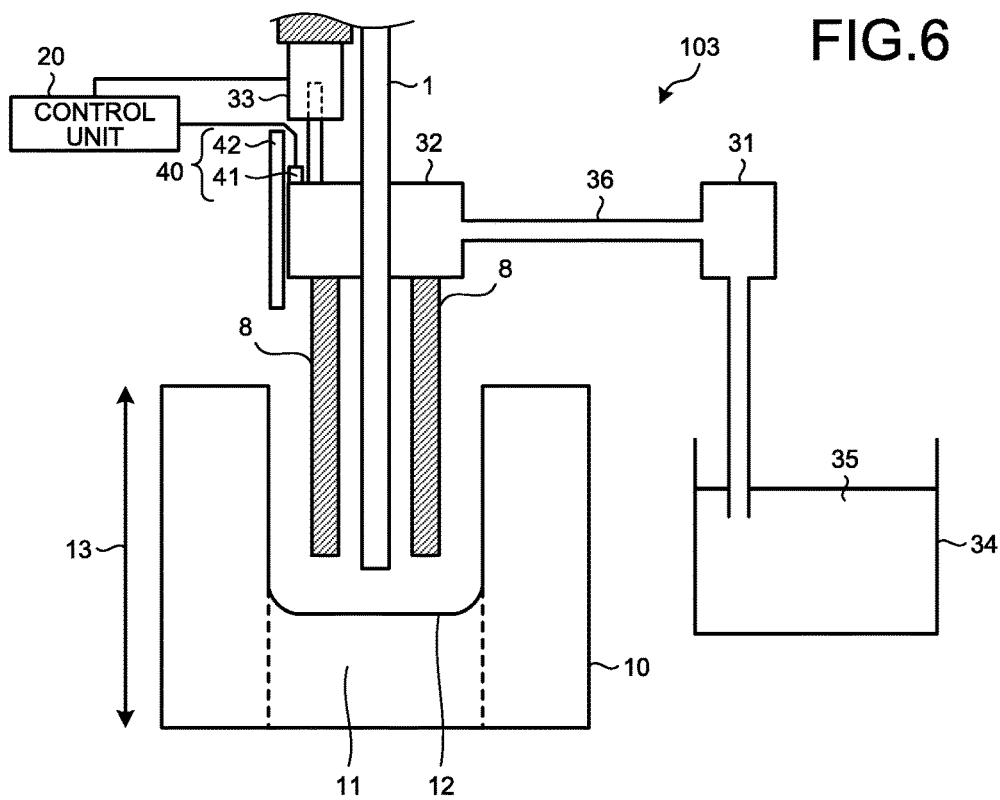
FIG. 6 is a diagram illustrating the configuration of a wire electrical discharge apparatus according to a fourth embodiment of the present invention.

FIG. 6 is a diagram illustrating the configuration of a wire electrical discharge apparatus 103 according to a fourth embodiment of the present invention. The wire electrical discharge apparatus 103 of FIG. 6 differs from the wire electrical discharge apparatus 102 of FIG. 5 in that the wire electrical discharge apparatus 103 of FIG. 6 further includes a position detection unit 40 that measures the vertical position of the guide pipe 8. Thus in FIG. 6, part of the wire electrical discharge apparatus 103, mainly those added elements is illustrated. The description of the same components as those of the wire electrical discharge apparatus 102 in FIG. 5 is omitted. The value measured by the position detection unit 40 is sent to the control unit 20.

The position detection unit 40 has a sensor head 41 that is mounted on the coupling 32 and moves vertically, and a fixed scale 42, and can measure the vertical position of the guide pipe 8. The illustration of a fixed part of the scale 42 is omitted in FIG. 6. The configuration of the position detection unit 40 may be different from that in FIG. 6. A guide-pipe drive unit 33 may be operated by a motor with an encoder, and may include a mechanism that measures the vertical position of the guide pipe 8.

In the wire electrical discharge apparatus 103 according to the fourth embodiment, the guide pipe 8 descends as the electrical discharge machining proceeds. Thus, the position detection unit 40 measures the vertical position of the guide pipe 8, thereby enabling the control unit 20 to grasp the progress of initial hole machining. When the control unit 20 determines that the feed distance of the guide pipe 8 since the start of the machining has become greater than or equal to the distance of the thickness 13 of the workpiece, on the basis of a value measured by the position detection unit 40, the control unit terminates the electrical discharge machining. That is, on the basis of the feed distance of the guide pipe 8, the control unit 20 detects that the guide pipe 8 has passed through the workpiece 10 and thus the machining of the initial hole 11 has been completed. This can prevent the wire electrical discharge apparatus 103 from performing a needless electrical discharge machining such as machining another portion of the workpiece after the completion of machining of the initial hole 11.

Thus, the wire electrical discharge apparatus 103 according to the fourth embodiment can directly measure the depth of machining during the machining of the initial hole 11, so that the completion of machining of the initial hole 11 can be detected with a high degree of accuracy without being affected by the wear of the wire electrode 1.

Fifth Embodiment

Figure 7:
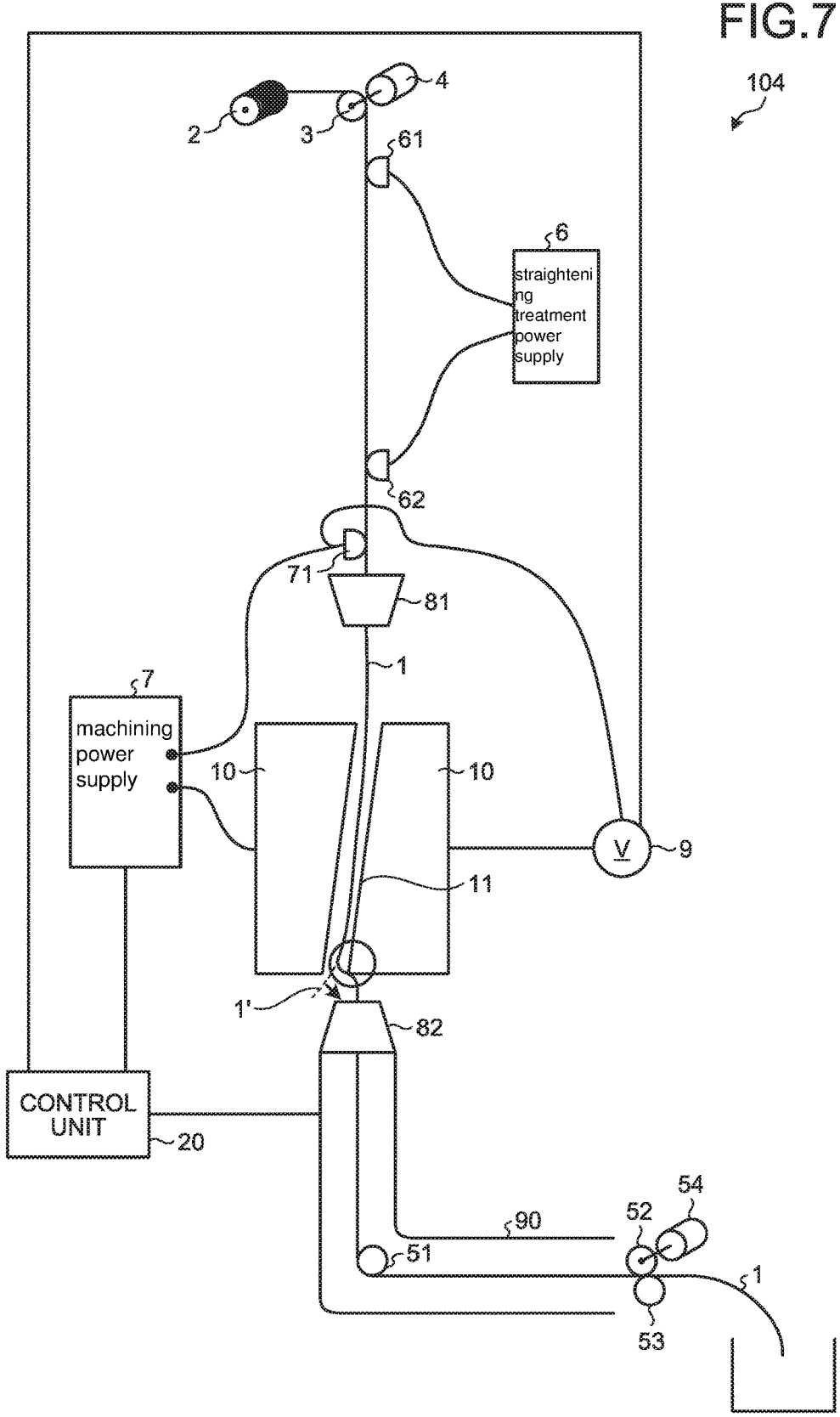
FIG. 7 is a diagram illustrating the configuration of a wire electrical discharge apparatus according to a fifth embodiment of the present invention.

FIG. 7 is a diagram illustrating the configuration of a wire electrical discharge apparatus 104 according to a fifth embodiment of the present invention. The wire electrical discharge apparatus 104 of FIG. 7 differs from the wire electrical discharge apparatus 100 of FIG. 1 in that the wire electrical discharge apparatus 104 further includes a contact detection unit 9 and the control unit 20 can move a lower arm 90 including a lower nozzle 82. In FIG. 7, the elements added to FIG. 1 and the parts necessary for the explanation of the fifth embodiment are illustrated, and part of the configuration illustrated in FIG. 1 is omitted. Hereinafter, the description of the same components as those of the wire electrical discharge apparatus 100 of FIG. 1 is omitted.

The wire electrical discharge apparatus 104 includes the contact detection unit 9, an upper nozzle 81, the lower arm 90, a lower roller 51, collection rollers 52, 53, and a collection motor 54. The contact detection unit 9 detects contact between the wire electrode 1 and the workpiece 10. The upper nozzle 81 passes the wire electrode 1 and the machining fluid through the inside thereof. The lower arm 90 includes the lower nozzle 82. The lower nozzle 82 is provided below the workpiece 10 and sucks the wire electrode 1. The lower roller 51 is set in the lower arm 90 and changes the direction of the wire electrode 1. The collection rollers 52, 53 collect the wire electrode 1, and the collection motor 54 drives the collection roller 52. The contact detection unit 9 has a function of detecting an electrical contact between the wire electrode 1 and the workpiece 10, and is connected to the control unit 20. A specific example of the contact detection unit 9 is a voltmeter connected having its one end to the feed terminal 71 and the other end to the workpiece 10. The control unit 20 can detect the electrical contact between the wire electrode 1 and the workpiece 10, on the basis of a voltage value sent from the contact detection unit 9. The lower arm 90 includes a suction mechanism (not shown) for the lower nozzle 82 to suck the wire electrode 1. The collection motor 54 and the suction mechanism are also controlled by the control unit 20.

A wire electrode 1' prior to being sucked when the wire electrode 1 has passed through the workpiece 10 via the initial hole 11 is shown by a dotted line in FIG. 7. Even when the initial hole 11 is not formed perpendicularly due to some cause during the machining, and is formed to have an inclination as illustrated in FIG. 7, sucking the distal end of the wire electrode 1' on the lower nozzle 82 side can thread the wire electrode 1 therethrough. However, in that case, the wire electrode 1 may electrically contact the workpiece 10 when tension is applied to the wire electrode 1 after the completion of the threading. It is important for the electrical discharge machining to maintain an appropriate distance between the wire electrode 1 and the workpiece 10. When the wire electrode 1 and the workpiece 10 are in electrical contact, current flows but the electrical discharge does not occur, and thus the electrical discharge machining cannot be performed. Thus, the wire electrical discharge apparatus 104 according to the fifth embodiment solves this problem using the following procedure.

Figure 8:
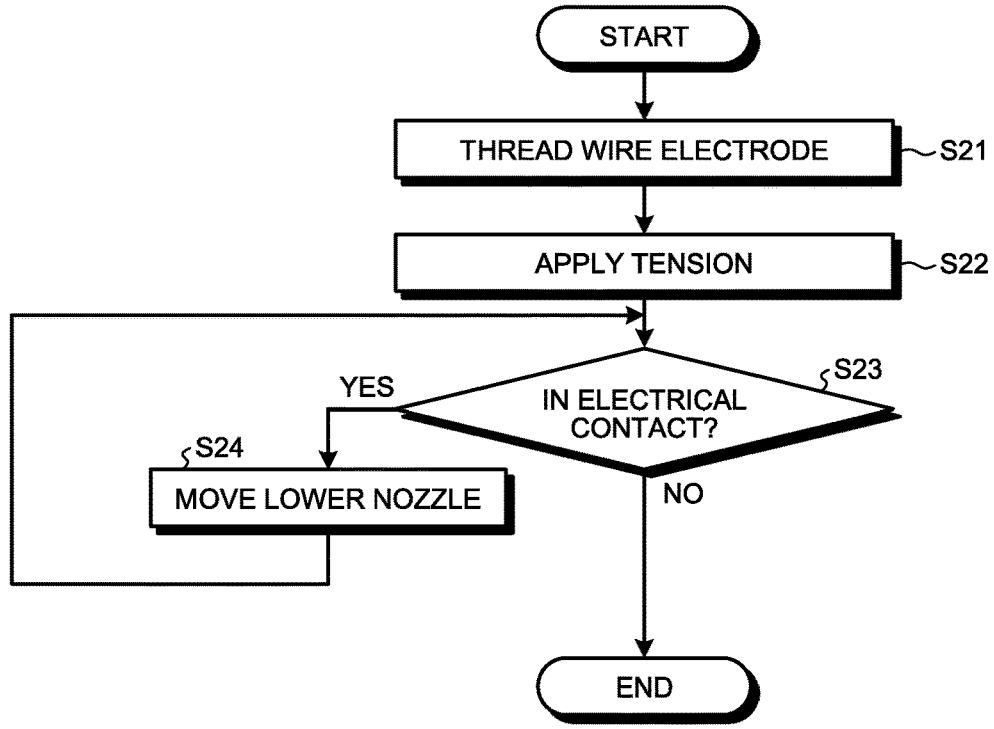
FIG. 8 is a flowchart explaining an operation of the wire electrical discharge apparatus according to the fifth embodiment.

FIG. 8 is a flowchart explaining an operation of the wire electrical discharge apparatus 104 according to the fifth embodiment. FIG. 8 demonstrates the operation after the completion of the machining of the initial hole 11 described in the first to fourth embodiments. Thus, the guide pipe 8 may be provided between the upper nozzle 81 and the workpiece 10 in FIG. 7.

First, the lower nozzle 82 sucks the wire electrode 1 via the initial hole 11 for threading the wire electrode therethrough (step S21). At a point in time when the wire electrode 1' is sucked by the lower nozzle 82, tension is applied to the wire electrode 1 (step S22). Then, with the machining power supply 7 applying a voltage to the wire electrode 1 and the workpiece 10, the control unit 20 detects whether the wire electrode 1 is in electrical contact with the workpiece 10 or not on the basis of a voltage value measured by the contact detection unit 9 (step S23). When the wire electrode 1 and the workpiece 10 are in electrical contact (step S23: Yes), the lower arm 90 is moved relative to the workpiece 10 to thereby move the lower nozzle 82 in a path as described below (step S24). When step S24 brings the wire electrode 1 out of electrical contact with the workpiece 10, and an electrically noncontact position is detected (step S23: No), the process ends. That is, the control unit 20 moves the lower nozzle 82 until the detection of no electrical contact. In step S24, the lower nozzle 82 is moved. Alternatively, a drive shaft that moves the upper nozzle 81 and the lower nozzle 82 simultaneously and a drive shaft that moves the upper nozzle 81 relative to the lower nozzle 82 may be moved in opposite directions by the same distance. That is, it is only necessary to be able to move the lower nozzle 82 relative to the workpiece 10.

Figure 9:
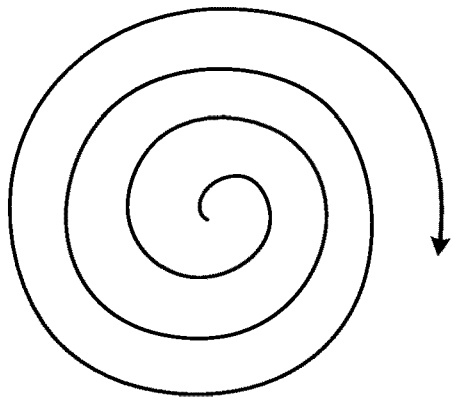
FIG. 9 is a diagram illustrating an example of a movement path of a lower nozzle according to the fifth embodiment.
Figure 10:
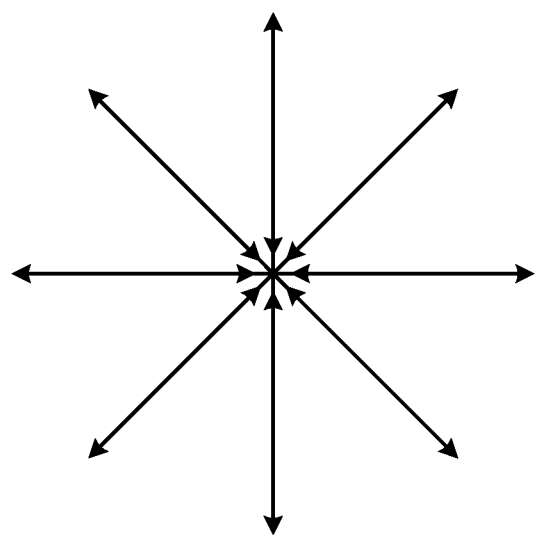
FIG. 10 is a diagram illustrating an example of a movement path of the lower nozzle according to the fifth embodiment.
Figure 11:
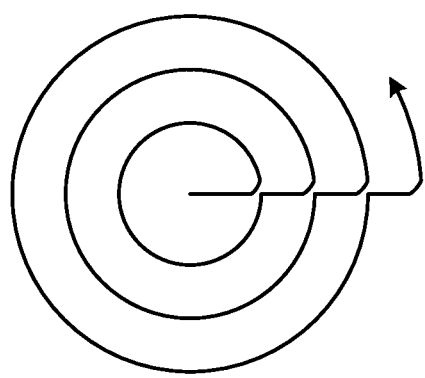
FIG. 11 is a diagram illustrating an example of a movement path of the lower nozzle according to the fifth embodiment.
Figure 12:
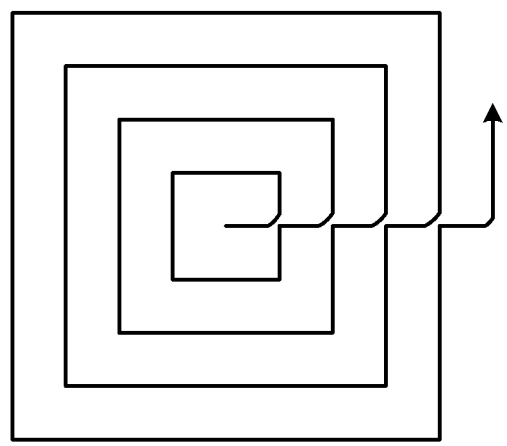
FIG. 12 is a diagram illustrating an example of a movement path of the lower nozzle according to the fifth embodiment.

FIGS. 9 to 12 illustrate examples of a movement path of the lower nozzle 82 in step S24. FIGS. 9 to 12 are diagrams each illustrating the example of the movement path of the lower nozzle 82 according to the fifth embodiment. FIG. 9 illustrates a movement path where the lower nozzle 82 spirally moves from the current position, increasing the radius. FIG. 10 illustrates movement paths where radial movements of the lower nozzle 82 away from and then back to the current position are made in turn changing angles. FIG. 11 is a movement path where the lower nozzle 82 moves in a circle of a fixed radius as the radius increases per circular movement. FIG. 12 is a movement path where the lower nozzle 82 moves in a square shape of the sides of a fixed dimension as the dimension of the sides increases per square movement. When the electrically noncontact position is detected in the middle of any movement path selected (step S23: No), the process ends.

After the completion of the operation illustrated in the flowchart of FIG. 8, the electrical discharge machining is performed with the wire electrode 1 and the workpiece 10 out of electrical contact with each other to machine the initial hole 11 such that the wire electrode 1 is corrected to be oriented perpendicularly. Then, an intended electrical discharge machining can be started.

In the wire electrical discharge apparatus 104 according to the fifth embodiment, when the electrical contact between the wire electrode 1 and the workpiece 10 is detected upon the threading of the wire electrode 1 after the completion of the machining of the initial hole 11, the lower nozzle 82 is moved relative to the workpiece 10 to avoid the electrical contact between the wire electrode 1 and the workpiece 10. This enables the application of a machining voltage with the wire electrode 1 and the workpiece 10 out of electrical contact with each other even when the initial hole 11 is bent or inclined, so that short circuits during the wire electrical discharge machining can be prevented to achieve a stable machining.

The configurations illustrated in the above embodiments illustrate an example of the subject matter of the present invention, and can be combined with another known art, and can be partly omitted or changed without departing from the scope of the present invention.

REFERENCE SIGNS LIST 1, 1' wire electrode, 2 wire bobbin, 3 wire feed roller, 4 wire feed motor, 5 encoder, 6 straightening treatment power supply, 7 machining power supply, 8 guide pipe, 9 contact detection unit 10 workpiece, 11 initial hole, 12 machined hole, 13 thickness of a workpiece, 20 control unit, 31 machining fluid feed pump, 32 coupling, 33 guide-pipe drive unit, 34 machining fluid tank, 35 machining fluid, 36 hose, 37 cut debris, 40 position detection unit, 41 sensor head, 42 scale, 51 lower roller, 52, 53 collection roller, 54 collection motor, 61 upper energization terminal, 62 lower energization terminal, 71 feed terminal, 81 upper nozzle, 82 lower nozzle, 90 lower arm, 100, 101, 102, 103, 104 wire electrical discharge apparatus.

The invention claimed is:
1. A wire electrical discharge apparatus comprising:
a wire bobbin on which a wire electrode is wound;
a straightening treatment power supply to supply a current to an upper energization terminal and a lower energization terminal to perform straightening treatment on the wire electrode fed from the wire bobbin;
a machining power supply to apply a voltage between a workpiece and the wire electrode that has been subjected to the straightening treatment via a feed terminal set below the upper energization terminal and the lower energization terminal and above the workpiece and contacting the wire electrode, to perform electrical discharge machining to form an initial hole in the workpiece;
a numerical control unit configured to execute instructions to control the straightening treatment power supply to supply the current and the machining power supply to apply the voltage; and
a vertically movable guide pipe provided below the feed terminal and above the workpiece, the guide pipe having an inside having an insulation property from the wire electrode, the guide pipe allowing passage of the wire electrode through the inside, the guide pipe descending into the initial hole.

2. The wire electrical discharge apparatus according to claim 1, wherein
when a distance by which the wire electrode has been fed after the straightening treatment becomes greater than or equal to a length of the wire electrode subjected to the straightening treatment once, the numerical control unit causes the straightening treatment power supply to supply the current to the upper energization terminal and the lower energization terminal to perform the straightening treatment again.

3. The wire electrical discharge apparatus according to claim 1, further comprising:
a coupling to allow a machining fluid to flow through the inside of the guide pipe with the wire electrode passing through the inside;
a machining fluid feed pump to feed the machining fluid to the inside of the guide pipe via the coupling; and
a guide-pipe drive motor to push the guide pipe downward.

4. The wire electrical discharge apparatus according to claim 3, wherein
the numerical control unit controls the guide-pipe drive motor such that a thrust of the guide-pipe drive motor pushing the guide pipe downward is smaller than a product of a pressure of the machining fluid fed to the inside of the guide pipe and an area of an outer diameter of the guide pipe.

5. The wire electrical discharge apparatus according to claim 1, further comprising
a position sensor to measure a vertical position of the guide pipe.

6. The wire electrical discharge apparatus according to claim 5, wherein
the numerical control unit terminates the electrical discharge machining when the numerical control unit determines that a feed distance of the guide pipe since a start of the machining has become greater than or equal to a distance of a thickness of the workpiece, on a basis of a value measured by the position sensor.

7. A wire electrical discharge apparatus comprising:
a wire bobbin on which a wire electrode is wound;
a straightening treatment power supply to supply a current to an upper energization terminal and a lower energization terminal to perform straightening treatment on the wire electrode fed from the wire bobbin;
a machining power supply to apply a voltage between a workpiece and the wire electrode that has been subjected to the straightening treatment via a feed terminal set above the workpiece and contacting the wire electrode, to form an initial hole in the workpiece;

a lower nozzle provided below the workpiece, to suck the wire electrode;

a voltmeter to detect an electrical contact between the wire electrode and the workpiece; and a numerical control unit configured to execute instructions to:

control the straightening treatment power supply to supply the current and the machining power supply to apply the voltage; and move the lower nozzle relative to the workpiece, when the numerical control unit detects the electrical contact between the wire electrode and the workpiece via the voltmeter when the wire electrode is sucked via the initial hole by the lower nozzle and threaded therethrough and tension is applied to the wire electrode after the initial hole is machined, until no electrical contact is detected.

8. The wire electrical discharge apparatus according to claim 7, wherein when a distance by which the wire electrode has been fed after the straightening treatment becomes greater than or equal to a length of the wire electrode subjected to the straightening treatment once, the numerical control unit causes the straightening treatment power supply to supply the current to the upper energization terminal and the lower energization terminal to perform the straightening treatment again.

9. The wire electrical discharge apparatus according to claim 7, further comprising a vertically movable guide pipe provided below the feed terminal and above the workpiece, the guide pipe having an inside having an insulation property from the wire electrode, the guide pipe allowing passage of the wire electrode through the inside.

10. A wire electrical discharge apparatus comprising:

a wire electrode;

a straightening treatment power supply to supply a current to an upper energization terminal and a lower energization terminal;

a machining power supply to apply a voltage between the wire electrode and a workpiece via a feed terminal set below the upper energization terminal and the lower energization terminal and above the workpiece, and contacting the wire electrode;

a vertically movable guide pipe provided below the feed terminal and above the workpiece, the guide pipe having an inside having an insulation property from the wire electrode, the guide pipe allowing passage of the wire electrode through the inside; and a numerical control unit configured to execute instructions to control the machining power supply so as to apply a voltage between the workpiece and the wire electrode to perform electrical discharge machining to form an initial hole in the workpiece, wherein the guide pipe descends into the initial hole.

* * * * *